Figure 1:
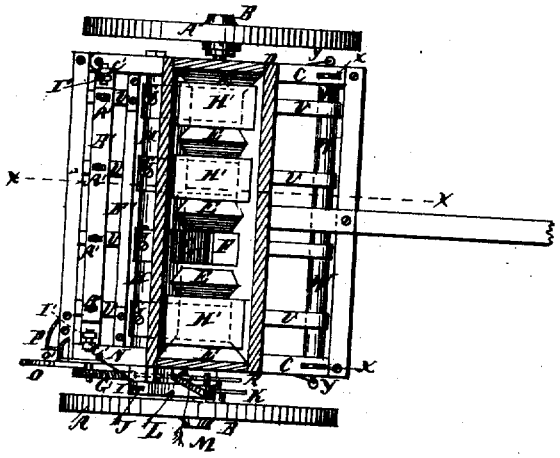
Figure 1:
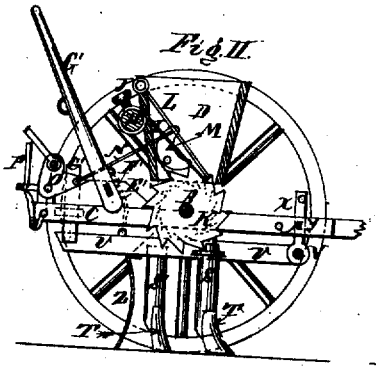
Figure 1:
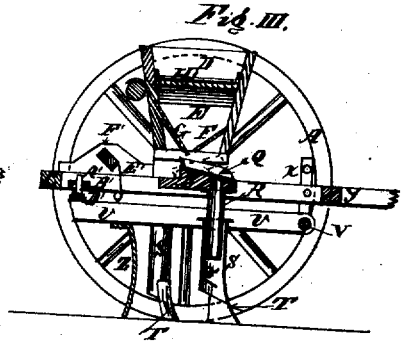

J. C. DAMAN.

GRAIN-DRILLS.

No. 7,434.

Reissued Dec. 19, 1876.

Fig. II.

Fig. III.

Witnesses:
F. Barrett
Richard Gerner

Inventor:
James C. Daman.
Per: Henry Gerner
his Atty.

THE GRAPHIC CO. N.Y.

UNITED STATES PATENT OFFICE

JAMES C. DAMAN, OF ELK POINT, DAKOTA TERRITORY, ASSIGNOR OF ONE-HALF INTEREST TO JESSE B. WATSON.

IMPROVEMENT IN GRAIN-DRILLS.

Specification forming part of Letters Patent No. 170,241, dated November 23, 1875; reissue No. 7,134, dated December 19, 1876; application filed July 28, 1876.

*To all whom it may concern:*

Be it known that I, JAMES C. DAMAN, of Elk Point, in the county of Union and Territory of Dakota, have invented certain new and useful Improvements in Grain-Drills, of which the following is the specification:

This invention relates to certain new and useful arrangements of parts of a grain-drill, as hereinafter particularly set forth and claimed.

The invention will be readily understood by reference to the accompanying drawing, of which—

Figure I is a top plan of my improved machine. Fig. II is a sectional side elevation of the same, taken just inside of the driving-wheel. Fig. III is a central sectional elevation taken on the line *x x* of Fig. I.

The machine is supported on the wheels A, which have their bearings on suitable journals on the ends of the axle B. C is the frame, which is securely attached to the axle B. D is the hopper, which is secured, at its ends, to the axle B, blocks being interposed between the said hopper and axle, to raise the hopper to a convenient height above it. In the bottom of the hopper D are formed as many discharge-openings as the machine is designed to plant drills at a time. In the lower part of the hopper D, between the discharge-openings, are secured blocks E, the upper edges of which are V-shaped, to prevent the seed from lodging upon them. In the forward part of the space between the blocks E are placed inclined plates G, the lower ends of which shut against the lower ends of the plates F, and thus close the discharge-openings. The upper ends of the plate G pop out through holes in the upper part of the rear side of the hopper D, and are secured to the shaft H, which works in bearings attached to the rear side of the said hopper D, so that, by rocking the shaft H, the discharge-openings may be opened and closed. Upon one end of the shaft H is formed a tenon, upon which is placed a pawl, I, which is secured in place adjustably by a set-screw, J. The engaging end of the pawl I is held down upon the teeth of one or the other of the ratchet-wheels K by a spring, L, attached to the hopper D. One of the ratchet-wheels K is made smaller than the other. The larger ratchet is designed for feeding oats, barley, and other larger grains, and the smaller ratchet for feeding wheat and other small grains. When the machine is in use the spring-plates G open wide enough for the desired quantity of seed to pass out, and then close and yield enough for the pawl to pass a tooth of the ratchet-wheel. The feed with either ratchet is regulated by loosening the set-screw and adjusting-shaft to give the plates an opening sufficient to pass out the desired amount of seed. An index will be marked upon the pawl and shaft to gage the desired amount of seed to be dropped. To the hopper D, above the discharge-openings, and between the division-blocks E, are secured double-inclined plates H to prevent the entire weight of the grain from resting upon the inclined dropping-plates F G. M is a bent lever, pivoted to the end of the hopper D in such a manner that one of its ends may rest against the lower side of the pawl I. To the other end of the bent lever M is attached the end of a chain or rod, N, the other end of which is attached to the end of a bent lever, O, pivoted to the rear end of the side bar of the frame C. The lever O is provided with a projection, *o'*, which catches upon a spring-catch, P, attached to the rear end of the frame C, so that the pawl I may be locked away from the ratchet-wheel K, when desired, for convenience in turning around, and in passing from place to place. To the axle B, beneath each of the discharge-holes of the hopper D, is secured a spout, Q, which receives the seed and conducts it into upper end of the flexible tubes R attached to the axle B or to bars secured to the front and rear sides of the said axle B. The flexible tubes R enter the cavities of the hollow standards S, the lower parts of which are oval, and have oval or V-shaped plow-plates T attached to them, to open furrows to receive the seed. To the lower parts of the standard S, at the lower end of the cavities of said standards, are secured small inclined plates *s'*, to receive the seed and scatter it, and thus prevent its falling in bunches or in a narrow row. The hollow standards S are securely attached to the sides of the beams U, the forward ends of which have transverse holes formed through them to receive the rod V, upon which they are strung, and upon which they are kept at the proper distance apart by tubular washers W interposed between them, and through which the said rod also passes. The ends of the rod V are secured to the lower ends of the bars X, which pass up through mortises in the forward parts of the side beams of the frame C, where they are secured in place by bolts Y. Several holes are formed in the bars X to receive the bolts Y, so that the said bars may be moved up and down to adjust the plows to deposit the seed deeper or shallower in the ground, as may be desired. Z are the covering-plates, which are attached to the rear parts of the plow-beams U, and the lower parts of which are made wide and slotted, to cause them to rake the soil over the seed, and thus cover it. To the upper sides of the rear ends of the beams U are attached pins A′, which pass up through holes in a long cross-bar, B′. The ends of the cross-bar B′ are notched to receive and fit upon upright bars C′, attached to the inner sides of the side bars of the frame C. The cross-bar B′ holds the rear ends of the plow-beams U steady, and keeps them in their proper relative position. The end parts of the cross-bar B′ are provided with sliding bolts or plates I′, which enter notches or holes in the said bars C′, so as to lock the bar B′ in place, and hold the plows down to their work in hard soil. Coiled springs D′ are placed upon the pins A′, beneath the cross-bar B′, to give the necessary elasticity to the plows. To the rear part of the beams U are attached cords or chains E′, the upper ends of which are attached to the shaft F′, the journals of which work in bearings attached to the side bars of the frame C. To one end of the shaft F′ is attached a lever, G′, so that the plows may be raised from the ground, as desired. The plows may be supported away from the ground by catching the lever G′ upon a catch attached to the frame C.

Having thus described my invention, I desire to claim—

1. The division-blocks E, inclined plates F, and movable plates G, combined with the rock-shaft, pawl, and ratchet, as and for the purpose set forth.

2. The inclined plates F, movable plates G, and plates H′, combined with the hopper D, as and for the purposes set forth.

3. The adjustable rod V, carrying the tubular washers W, in combination with the arms *v v* pivoted to said rod V at their forward ends, and provided with pins at their rear ends, which pass through slots in the sliding bar B′, substantially as described, and for the purpose set forth.

4. The adjustable rod V, carrying the tubular washers W, and having the arms *v* pivoted thereto, in combination with the sliding bar B′, hollow standards S, provided with plows T, and scattering plates *s*′, and the flexible tube I, substantially as described, and for the purpose set forth.

JAMES C. DAMAN.

Witnesses:
J. S. TALCOTT,
JAS. E. BLAIR.